(12) United States Patent
Wu et al.

(10) Patent No.: US 10,776,290 B1
(45) Date of Patent: Sep. 15, 2020

(54) TECHNIQUES PERFORMED IN CONNECTION WITH AN INSUFFICIENT RESOURCE LEVEL WHEN PROCESSING WRITE DATA

(71) Applicant: EMC IP Holding Company LLC, Hopkinton, MA (US)

(72) Inventors: Peng Wu, Westborough, MA (US); Rong Yu, West Roxbury, MA (US); Jeremy J. O'Hare, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/568,576

(22) Filed: Sep. 12, 2019

(51) Int. Cl.
*G06F 13/16* (2006.01)
*G06F 3/06* (2006.01)
*G06F 12/06* (2006.01)
*G06F 12/10* (2016.01)

(52) U.S. Cl.
CPC ...... *G06F 13/1668* (2013.01); *G06F 12/0646* (2013.01); *G06F 12/10* (2013.01); *G06F 2212/1016* (2013.01); *G06F 2212/657* (2013.01)

(58) Field of Classification Search
None
See application file for complete search history.

(56) References Cited

U.S. PATENT DOCUMENTS

| | | |
|---|---|---|
| 7,047,366 B1 | 5/2006 | Ezra |
| 7,143,393 B1 | 11/2006 | Ezra et al. |
| 7,177,853 B1 | 2/2007 | Ezra et al. |
| 7,558,919 B1 | 7/2009 | Yochai et al. |
| 7,577,787 B1 | 8/2009 | Yochai et al. |
| 8,046,551 B1 | 10/2011 | Sahin |
| 9,235,516 B1 | 1/2016 | Marshak et al. |
| 9,767,021 B1 | 9/2017 | Wu et al. |

*Primary Examiner* — Scott C Sun
(74) *Attorney, Agent, or Firm* — Muirhead and Saturnelli, LLC

(57) ABSTRACT

Techniques for processing I/O operations includes: determining whether a current amount of unused physical storage is greater than a threshold; and responsive to determining the current amount of unused physical storage is greater than the threshold, performing normal write processing, and otherwise performing alternative write processing. The alternative write processing includes: initializing a counter; determining whether a physical storage allocation is needed or potentially needed for a write I/O operation; responsive to determining that no physical storage allocation is needed for the write I/O operation, performing the normal write processing. Responsive to determining that a physical storage allocation is needed or potentially needed for the write I/O operation, determining a first amount of one or more credits needed to service the write I/O operation; and responsive to determining the counter does not include at least the first amount of one or more credits, failing the write I/O operation.

20 Claims, 10 Drawing Sheets

TECHNIQUES PERFORMED IN CONNECTION WITH AN INSUFFICIENT RESOURCE LEVEL WHEN PROCESSING WRITE DATA

BACKGROUND

Technical Field

This application generally relates to data storage and, more particularly, techniques performed in connection with an insufficient resource level when processing write data.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, an application may executed on the host and the application may issue I/O (input/output) operations, such as data read and write operations, sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for processing I/O operations. Such techniques may include: receiving a write I/O operation that writes first data to a target location denoting a logical address; determining whether a current amount of unused physical storage is greater than a threshold; and responsive to determining the current amount of unused physical storage is greater than the threshold, performing normal write processing, and otherwise performing alternative write processing including: initializing a counter with an initial amount of credits; determining whether a physical storage allocation is needed or potentially needed for the write I/O operation; responsive to determining that no physical storage allocation is needed for the write I/O operation, performing the normal write processing; and responsive to determining that a physical storage allocation is needed or potentially needed for the write I/O operation, performing first processing comprising: determining a first amount of one or more credits needed to service the write I/O operation; determining whether the counter includes at least the first amount of one or more credits; and responsive to determining the counter does not include at least the first amount of one or more credits, failing the write I/O operation.

In at least one embodiment, the first processing may include, responsive to determining the counter includes at least the first amount of one or more credits, performing second processing including: deducting the first amount of one or more credits from the counter; storing the first data in a first cache location; marking the first cache location as including write pending (WP) data; marking the first cache location as consuming the first amount of one or more credits; and returning an acknowledgement to a host that issued the write I/O operation. The second processing may include responsive to determining a new physical storage location is needed for storing the first data, performing allocation processing to allocate the new physical storage location; determining whether the allocation processing successfully allocated the new physical storage location; and responsive to determining the allocation processing successfully allocated the new physical storage location, performing processing including: destaging the first data from the first cache location to the new physical storage location; and incrementing the counter by the first amount of one or more credits. The second processing may further comprise responsive to determining the allocation processing did not successfully allocate the new physical storage location, determining not to currently destage the first data from the first cache location.

In at least one embodiment, the alternative write processing may determine that no physical storage allocation is needed or potentially needed for the write I/O operation if the target location is currently mapped to a physical storage location and no compression is performed for data stored at the target location.

In at least one embodiment, alternative write processing may determine that physical storage allocation is needed or potentially needed for the write I/O operation if the target location is currently mapped to a physical storage location and the physical storage location is also referenced by at least one other logical address.

In at least one embodiment, the alternative write processing may determine that physical storage allocation is needed or potentially needed for the write I/O operation if the target location is currently mapped to a physical storage location and data stored at the target location is compressed.

In at least one embodiment, the alternative write processing may determine that physical storage allocation is needed for the write I/O operation if the target location is currently not mapped to a physical storage location.

In at least one embodiment, the alternative write processing may determine that physical storage allocation is needed or potentially needed for the write I/O operation if the target location is currently mapped to a physical storage location and data stored at the target location is encrypted.

In at least one embodiment, the threshold may be selected in accordance with a size of a cache used to store data for servicing I/O operations. The threshold may be selected as a percentage of the size of the cache, and wherein the percentage is less than 100%.

In at least one embodiment, the write I/O operation may write the first data to the target location that is a logical address on a first logical device, wherein the counter is one of a plurality of counters, and wherein the counter may be associated with a set of one or more logical devices including the first logical device. The current amount of unused physical storage may be with respect to physical storage devices of a plurality of storage tiers. The current amount of unused physical storage may be with respect to physical storage devices in one of a plurality of storage tiers.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
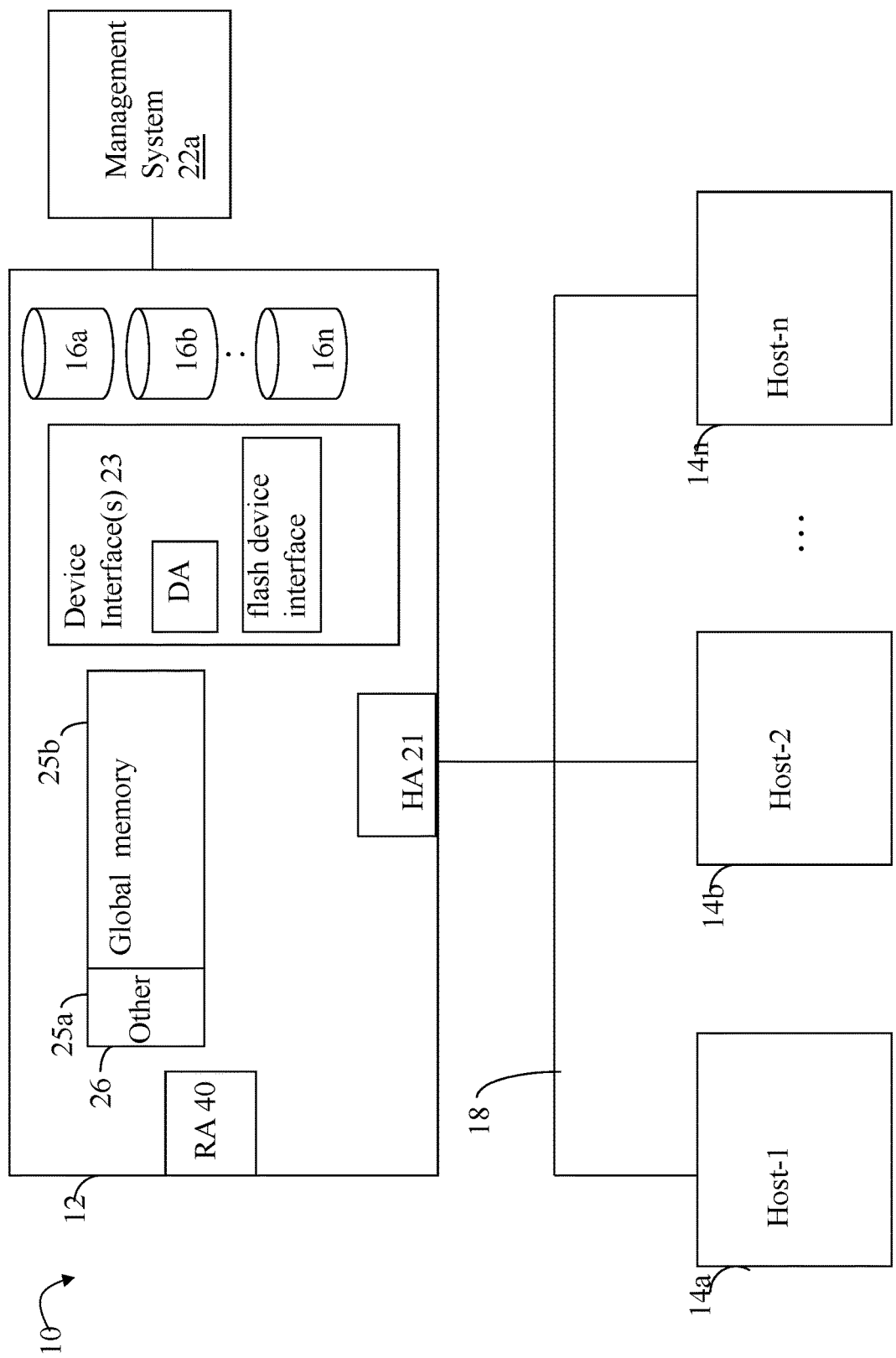
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors.

The data storage system 12 may be a data storage array including a plurality of data storage devices 16a-16n. The data storage devices 16a-16n are non-volatile physical storage devices (PDs) providing backend data storage for storing data provisioned for use in connection with logical devices, described elsewhere herein. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

In at least one embodiment, a data storage system may have multiple tiers of PDs. In at least one embodiment, the tiers may be ranked, in terms of relative performance, from a highest performance to a lowest performance tier. Each tier may include PDs having the same or similar performance characteristics. For example, an embodiment may include 3 tiers—a first highest performance tier of flash-based PDs, a second mid-range performance tier of 15K RPM rotating disk drives, and a third lowest performance tier of 10K RPM rotating disk drives. As another example, a data storage system may include multiple storage tiers of flash-based storage devices. A first highest performance tier may include a first type of flash-based storage devices and a second lower performance tier may include a second type of flash-based storage devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16*a*-16*n*. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25*b* may be used to facilitate data transfers and other communications between the device interfaces, HAs and/or RAs in a data storage array. In one embodiment, the device interfaces 23 may perform data operations using a cache that may be included in the global memory 25*b*, for example, when communicating with other device interfaces and other components of the data storage array. The other portion 25*a* is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16*a*-16*n* of the storage systems directly, but rather access to data may be provided to one or more host systems from what the host systems view as a plurality of logical devices or logical volumes (LVs), which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like.

Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16*a*-16*n*. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding PD and location on the PD. The DA which services the particular PD may further perform processing to either read data from, or write data to, the corresponding physical device location for the I/O operation.

Also shown in FIG. 1 is a management system 22*a* that may be used to manage and monitor the system 12. In one embodiment, the management system 22*a* may be used in connection with management of the data storage system 12.

In at least one embodiment, the management system 22*a* may be a computer system executing a management application.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing described herein in following paragraphs as well other suitable processing.

In an embodiment of a data storage system in accordance with the techniques herein, the components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 2:
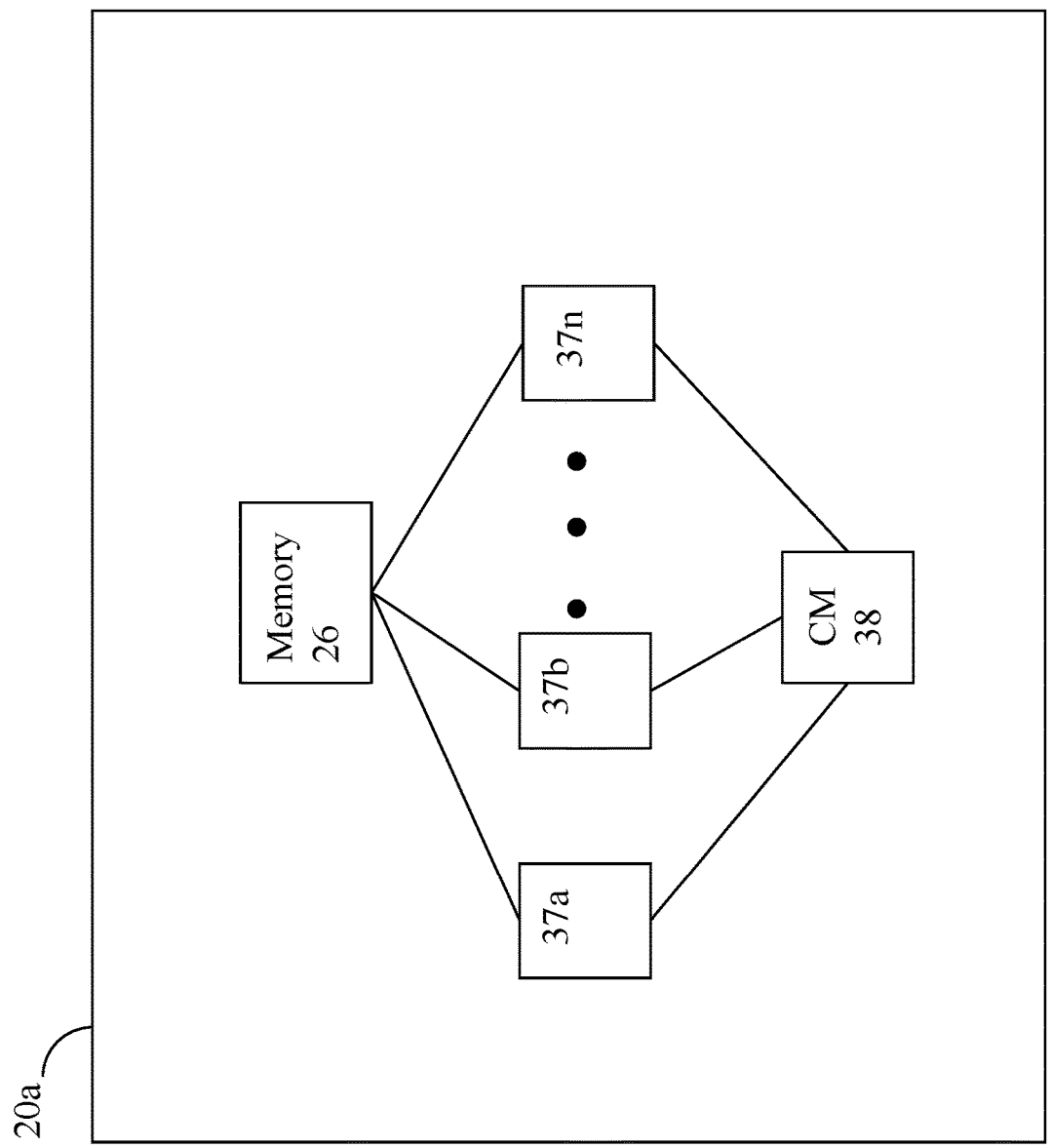
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37*a*-37*n* coupled to the memory 26. Each of the directors 37*a*-37*n* represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37*a*-37*n*. Each of the directors 37*a*-37*n* may be coupled to the CM 38 so that any one of the directors 37*a*-37*n* may send a message and/or data to any other one of the directors 37*a*-37*n* without needing to go through the memory 26. The CM 38 may be implemented using conventional MUX/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

With reference back to FIG. 1, components of the data storage system may communicate using GM 25*b*. For example, in connection with a write operation, an embodiment may first store the data in cache included in a portion of GM 25*b*, mark the cache slot including the write operation data as write pending (WP), and then later de-stage the WP data from cache to one of the devices 16*a*-16*n*. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16*a*-16*n* in which one or more of the devices 16*a*-16*n* are flash memory devices employing one or more different flash memory or SSD technologies. In at least one embodiment of the foregoing data storage array, the data storage devices 16*a*-16*n* may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed.

In connection with performing I/O operations, such as writes as well as reads, a data storage system in an embodiment in accordance with the techniques herein may use a cache in order to improve performance.

A data storage system may provide support for one or more types of logical devices or LUNs. The techniques herein may be used in an embodiment having thin or virtually provisioned logical devices. A thin logical device or LUN is a type of logical device where units of storage are progressively allocated on an as-needed basis. Typically, the base units of storage are provisioned from multiple sets of PDs organized as RAID groups, where these groups are partitioned into small portions sometimes referred to as slices. There is a mapping provided to relate the logical address in a thin device to the particular slice of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. Pat. No. 7,949,637, Issued May 24, 2011, Storage Management for Fine Grained Tiered Storage with Thin Provisioning, to Burke, both of which are incorporated by reference herein.

An embodiment in accordance with the techniques herein may provide for logical devices or LUNs that are thin or virtually provisioned devices along with thick logical devices. A thick device or LUN may be characterized as a regular logical device presented as having a particular storage capacity where physical storage is provisioned (allocated or bound) for the entire storage capacity when the thick device is configured.

The data storage system may provide various data services. For example, in at least one embodiment in accordance with the techniques herein, a data storage system may provide one or more data reduction services in efforts to reduce the size of the stored data, for example, stored on the backend non-volatile storage PDs of the data storage system. In at least one embodiment, the data reduction services may include compression and deduplication. In connection with data deduplication, processing may be performed to detect duplicate copies of the same data or content and store only a single copy of the data or content with multiple references to the single copy. The multiple references may denote, for example, logical addresses of where the data or content is stored.

In at least one embodiment, the data services may include encryption and decryption where data stored on backend PDs may be optionally stored in encrypted form. When stored encrypted data on the PDs is accessed for I/O operations, such as for servicing read cache misses (described in more detail elsewhere herein) the encrypted data may be decrypted, stored in cache, and used in connection with servicing the read operation. In at least one embodiment, data stored in encrypted form may not be deduplicated or compressed. In other words in such an embodiment, data for which encryption/decryption data services are performed is not also subjected to data reduction services (e.g., data reduction services may be disabled for data that is stored on PDs in its encrypted form).

In at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

In at least one embodiment in accordance with techniques herein, the snapshot facility may be TimeFinder® SnapVX™ by Dell Inc. using the COFW or ROW techniques as noted above. With ROW, when a source volume or logical device is written to and the original data of the source volume or logical device needs to be preserved for a snapshot(s), the new write is accepted and asynchronously written to a new location. The source volume now points to the new data while the snapshot(s) continue to point to the original data (e.g., the snapshot delta) in its original location. For example, U.S. patent application Ser. No. 15/969,048, filed May 2, 2018, "Efficient Snapshot Activation", Chandrashekhara et al, which is incorporated by reference herein in its entirety, describes in more detail processing that may be performed in at least one embodiment in connection with establishing or creating a targetless snapshot as well as a linked snapshot (e.g., linked to a logical device identifier), processing performed in connection with servicing I/O operations directed to the snapshot and source logical device, and other processing.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on a management system, such as another computer system or other device with a processor that is connected to the data storage system 12. Such commands may be, for example, to establish or modify data services; view performance or health of various system components and storage entities; provision storage; perform user account management; and the like. For example, commands may be issued over the control path to provision storage for LUNs; define a storage group (SG) which is a logically defined group of one or more LUNs; create a snapshot; define conditions of when to create another snapshot; define or establish local and/or remote replication services; define or modify a schedule for snapshot or other data replication services; define a RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Figure 3:
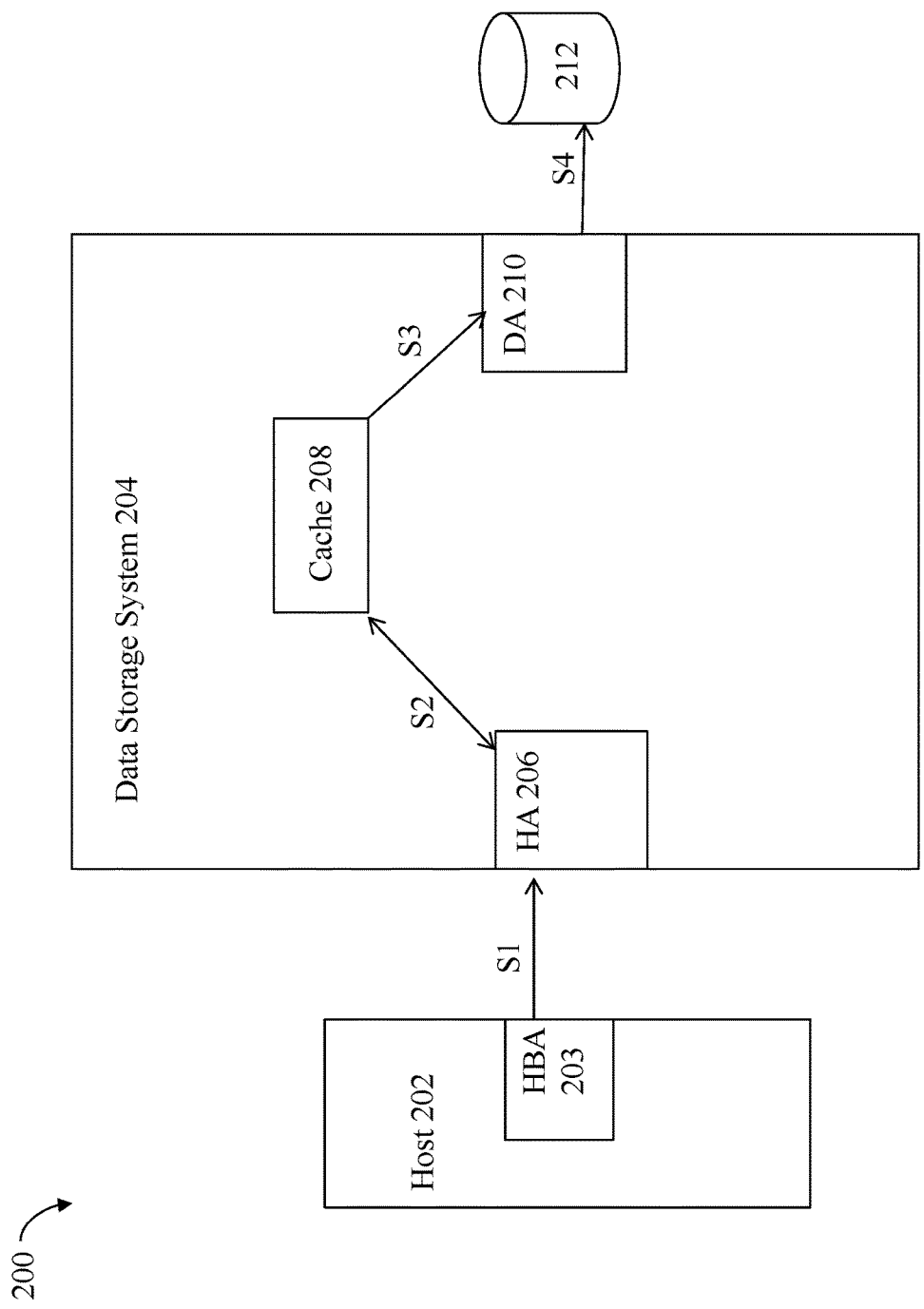
FIGS. 3 and 4 are examples illustrating processing that may be performed in connection servicing I/O operations on the data storage system in an embodiment in accordance with the techniques herein.

Referring to FIG. 3, shown is an example illustrating processing of a write I/O operation received at the data storage system in an embodiment in accordance with the techniques herein, whereby a host may issue the write operation. The example 200 includes host 202 and data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes DA 210, cache 208 and physical storage device 212, such as a disk drive. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with the techniques herein as well as other purposes that may vary with embodiment. In one embodiment such as illustrated in the example 200, the cache 208 may be a portion of global memory of the data storage system 204 whereby cache 208 is used as a data cache for data that is read from and/or written to physical storage such as in connection with I/O operations received from the host 202 at the data storage system 204. In following paragraphs and illustrated in FIG. 3 is processing performed for a write operation.

In a step S1, the host 202 may issue a write request over a port of its HBA 203 where the write request is received by the HA 206 of the data storage system 204. In a step S2, the HA 206 may store the write operation data in cache 208 and mark the cache slot or cache location as write pending (WP) thereby denoting the cache slot includes write data that needs to be written to physical storage. In some embodiments, the data storage system may return a response to the host indicating that the write operation has been completed successfully following S2 once the write data has been stored in the cache 208. Once the write data has been stored in cache 208 in the step S2, processing may be performed at some time later to destage the write data from cache 208 to the physical drive 212. Thus, in a step S3, the DA 210 may obtain the write data from cache 208 and then store the write data in a step S4 at the appropriate location on the physical device 212. Although not specifically illustrated herein and as will be appreciated by those skilled in the art, other processing may be performed in connection with processing the write operation such as, for example, setting the cache slot location to no longer indicate WP once the write data is written to physical storage in the step S4.

Figure 4:
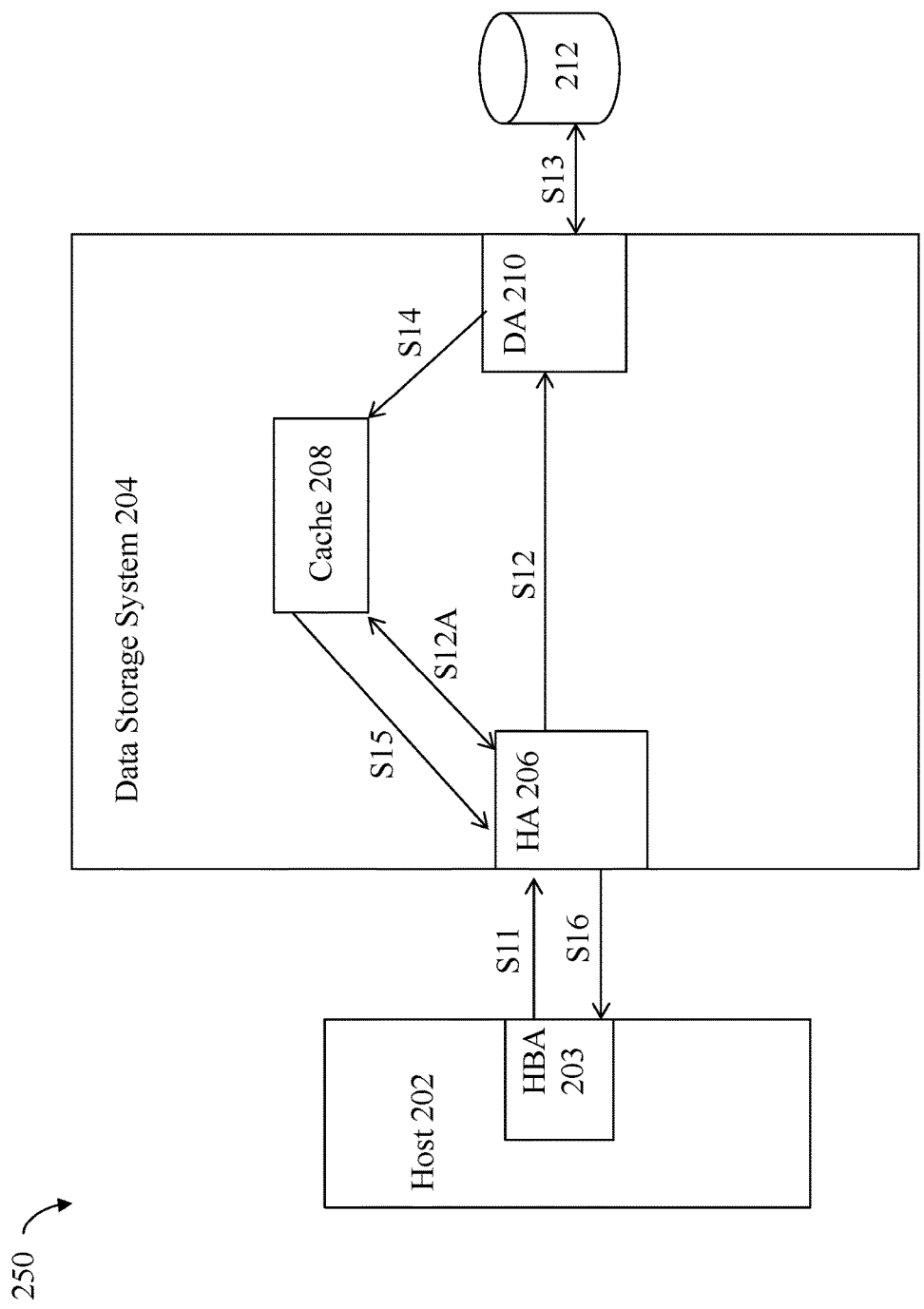

Referring to FIG. 4 shown is an example illustrating processing of a read I/O operation received at the data storage system in an embodiment in accordance with the techniques herein, whereby a host may issue the read operation. The example 250 includes host 202, data storage system 204, and components similarly numbered and as described elsewhere herein.

As a first step S11, the host 202 sends the read request to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in a step S12A and returns the requested read data to the host 202 in a step S16. Alternatively, if the read request is a read miss, processing may be performed to retrieve the data from physical storage, store the requested read data in cache, and then return the cached read data to the host. In connection with read miss processing, the HA 206 may request S12 that a back-end component, such as the DA 210, retrieve the requested data from physical storage device 212. It should be noted that in performing S12, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in a step S13. The DA 210 may store the read data in cache 208 in a step S14. The HA 206 may then retrieve the read data in a step S15 from the cache 208 and then return the requested read data (as retrieved from cache) to the host 202 in a step S16.

Requests to read and/or write data, such as for I/O operations received by an HA from the host, identify a location of where data is read from or written to, where such location is expressed in terms of a LUN and LUN offset (e.g., LBA or logical block address) in the LUN's logical address space. Data for the LUN and LUN offset is stored at a physical storage location on a physical device (PD). Thus, the LUN and LUN offset may be mapped by the data storage system to a physical device (PD) and location on that PD when reading data from and/or writing data to that LUN and LUN offset. For example, a DA may map the LUN and LUN offset to a corresponding PD and location on the PD.

It should be noted that discussion above in connection of FIGS. 3 and 4 for, respectively, write and read I/O operation processing, may be characterized as a simplified view of processing in connection with the data path or I/O path that omits specific mention of other components and possible data services that may be performed, such as data reduction or encryption and decryption. In at least one embodiment, an additional type of adapter or director, the data service adapter, may be included in the data storage system. In such an embodiment, the data storage system may include multiple data service adapters that may be characterized as a adapters that perform processing as a middle layer between the front end components, such as the HAs or FAs, and the back end components, such as the DAs. The data service adapters may facilitate communications between the front end and the back end components and perform various services or tasks in connection with operations or requests that may be initiated by the front end and back end components. For example, an FA may issue a request to a data service adapter to perform a service or task in connection with an I/O operation, such as a write I/O operation received from a host.

Generally, encryption is a data service that may be optionally performed as part of the I/O or data path when destaging data from the cache to the backend PDs to store the cached data in its encrypted form on a PD. As may be needed in connection with servicing I/O operations, encrypted data stored on a PD may be read and then decrypted, such as when reading the data from the PD to service a read miss, where the decrypted data is stored in the cache.

Data reduction services may be applied to data in connection with the data or I/O path. For example, compression and deduplication may be performed as part of the data or I/O path of a write operation. Data stored in its compressed form on a PD is decompressed such as when reading the data from the PD where the decompressed data is then stored in the cache. Data that has been deduplicated has its original form or content restored or reconstructed as may be needed, such as when returning the data to a client in response to a read I/O operation.

The cache, like other data storage system resources, may be a finite resource whereby the data storage system may have a limited amount of cache for storing user data in connection with servicing read and/or write operations, such as described above. There may be times when data cache consumption for storing WP data in a data storage system may reach an undesirable level and processing may be performed to destage WP data from cache to physical storage. It should be noted that the data storage system may also destage WP data from the cache at other times in connection with other conditions.

As described in more detail in following paragraphs, the size of a single unit of cache data may be referred to herein as a page. The size of a page may vary with embodiment. Thus the granularity or amount of data to be destaged in a single destaging operation may vary with embodiment. In one exemplary embodiment, the size of a page denoting an amount of data that can be destaged from cache as a single unit may be 42 tracks (e.g., each track may be, for example, 128K bytes of data). In a single cache page, not all the data of the single cache page may be WP data. For example, within a single cache page, it may be that one or more portions of the page include WP data as well as non-WP data. For example, the cache page may include non-WP data that includes data read from a physical device and stored in the cache page in connection with servicing a read miss operation. Additionally, one or more portions of the same cache page including WP data may be empty and contain no data.

Figure 5:
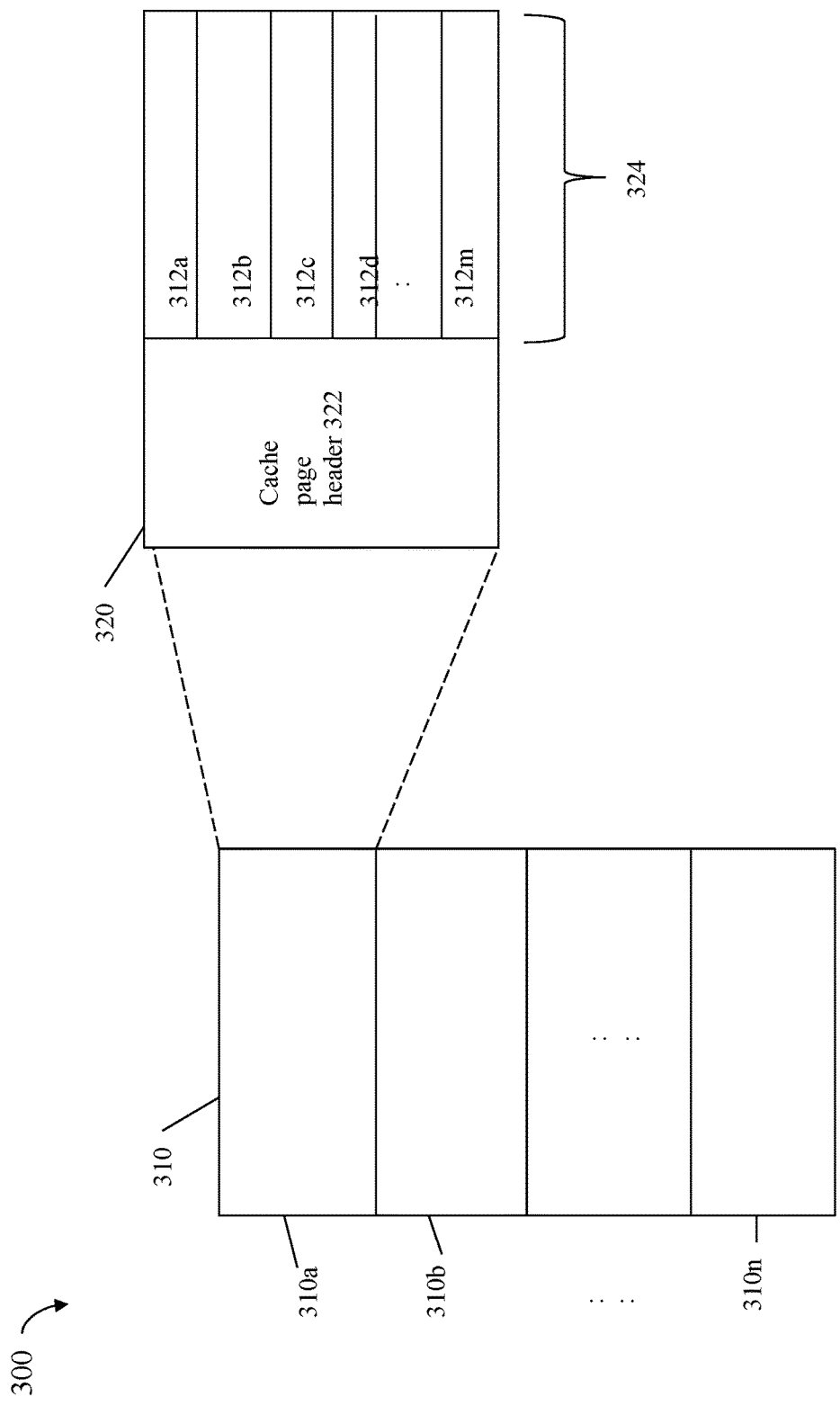
FIG. 5 is an example illustrating a logical representation of a data cache that may be used in an embodiment in accordance with the techniques herein.

Referring to FIG. 5, shown is an example illustrating a logical representation of a data cache that may be used in an embodiment in accordance with the techniques herein. In the example 300, element 310 may represent the memory or storage used as the data cache which is partitioned into cache pages 310a-310n. It should be noted that the example 300 is a logical representation of a cache that may be implemented using any suitable data structure(s) known in the art. As described elsewhere herein, each of the cache pages 310a-n may contain varying amounts of WP data. Element 320 provides additional detail of single cache page 320. Cache page 320 may include a cache page header 322 and cache page data 324. The cache page data 324 illustrates that a single cache page of data may further include multiple portions 312a-m each of which may or may not include WP data and each of which may or may not include any cached data. The cache page header 322 may include additional information, such as metadata, regarding the cached data stored in 324. For example, the header 322 may denote whether the data cached in each of the portions 312a-m is WP data.

Although not illustrated in FIG. 5 for simplicity and as known by those of ordinary skill in the art, an embodiment may store additional information for each of the cache pages regarding the data stored in each such page. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the data cache 310 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD.

In a single cache page such as 310a (illustrated in more detail by 320), not all the data of the single cache page may be WP data. For example, within a single cache page, it may be that one or more portions 312a-m of the page 320 include WP data as well as non-WP data. For example, the cache page 320 may include non-WP data in 312a and 213c (e.g., 312a and 312c may include data read from a physical device and stored in the cache page in connection with servicing a read miss operation). Additionally, one or more portions 312a-m of the same cache page 320 including WP data may be empty and contain no data. For example, all of page 320 may include WP data except for 312a-b which may contain no cached data.

It should be noted that each portion 312a-m of a cache page may correspond, for example, to a track or other storage size unit. In an embodiment having a cache page size of 42 tracks, "m" denoting the number of portions in a single cache page 320 may be 42. For each track of a cache page, some or all data of a single track may be stored in cache since the size unit for reading and writing data may be less than a track depending on the embodiment. In connection with determining a current amount of the data 310 cache that is consumed for WP data, only those one or more portions 312a-m of each cache page 310a-n including WP data are considered. The current amount of cache data consumed for storing WP data may be expressed in units of granularity such as at the track level represented by each of 312a-m. If any single track, or more generally, single data portion (e.g., one of 312a-m) includes any WP data, the track may be counted as consumed for storing WP data.

The cache, like other data storage system resources, may be a finite resource whereby the data storage system may have a limited amount of cache for storing user data in connection with servicing read and/or write operations, such as described above. A cache location including WP data cannot be overwritten or reused until the WP data has been written out to physical storage. Thus, the data storage system may destage data from cache at various points in time.

In connection with destaging data, each single destaging operation may operate on data stored in a single cache page. Thus, for a single destage operation in which a single cache page is 42 tracks, a maximum of 42 tracks of WP data is destaged from cache to physical storage (e.g., if the single cache page is full and includes only WP data). If the single cache page does not include 42 tracks of WP data, the destaging of the cache page results in destaging only those data portions of the page which are WP.

Figure 6:
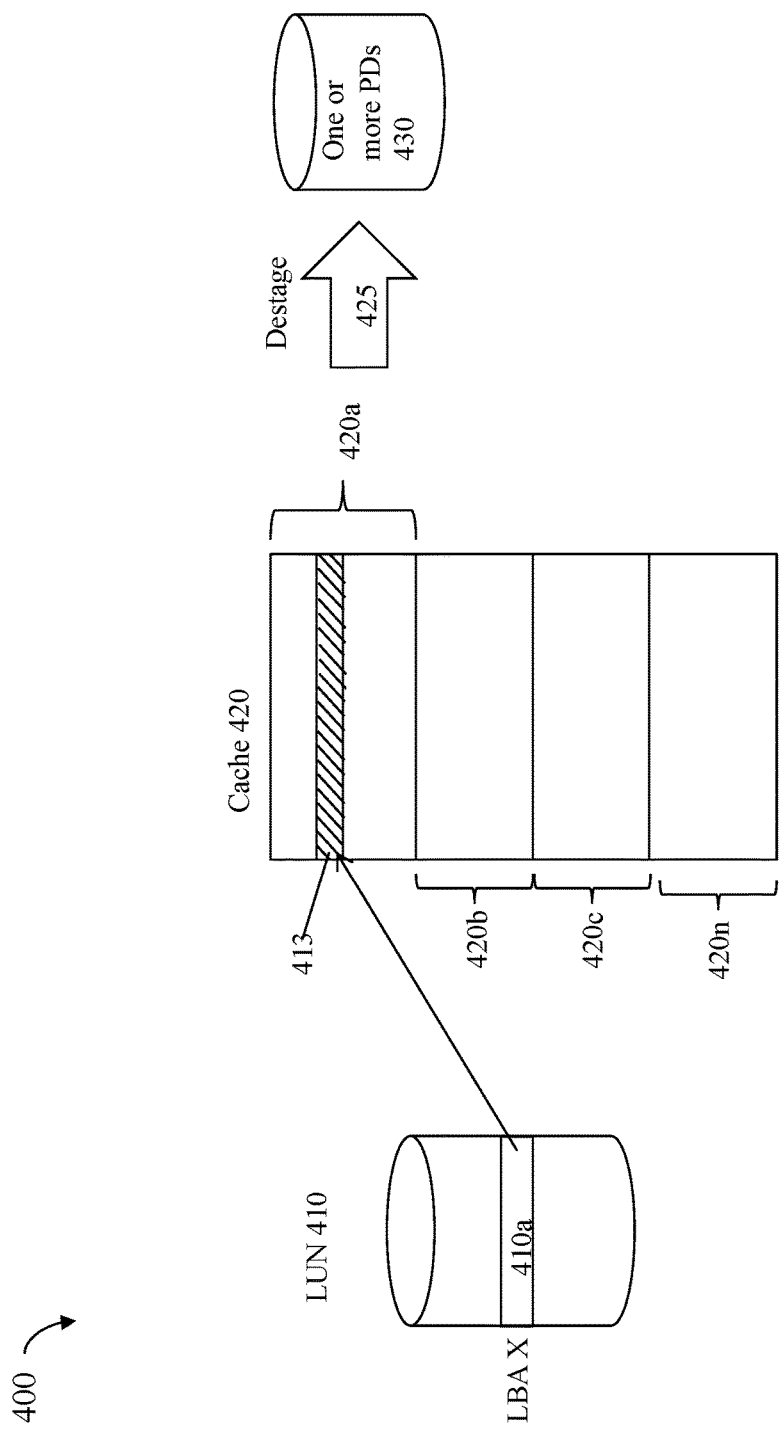
FIG. 6 is an example illustrating use of a data cache in connection with a write operation in an embodiment in accordance with the techniques herein.

Referring to FIG. 6, shown is an example illustrating different views of cached data in an embodiment in accordance with the techniques herein. The example 400 includes LUN 410, cache 420 and one or more PDs 430. Cache 420 may include cache pages 420a-n. Cache 420 may be a data cache similar to that as described elsewhere herein (e.g., element 310 of FIG. 5 and element 208 of FIGS. 3 and 4). An HA may receive a write operation to store write data at a LUN offset or LBA X of LUN 410. Element 410a may denote the write data written to LBA X of LUN 410. The HA may write the data 410a to cache location 413 included in cache page 420a of cache 420 whereby cache location 413 may be marked as containing WP data. The foregoing use and mapping of LUNs/LBA to cache may be characterized as the HA or front end component view where the HA uses data storage locations expressed in terms of LUNs and LBAs.

At a later point in time after write data 410a is placed in the cache at location 413, a DA may destage 425 data from cache page 420a to one or more PDs 430. For destaging, the DA operates on single cache pages destaging data of the single cache page 420a. The foregoing use and mapping of cache to PD/PD location may be characterized as the DA or backend component view where the DA uses data storage locations expressed in terms of PDs and PD locations.

Each cache page may include data stored at logically contiguous sequential LBA locations (e.g., each cache page corresponds or maps to a contiguous, consecutive LBA range of a LUN). For example, assuming a cache page size of 42 tracks, cache page 420a may include data stored on tracks 0-41 of LUN 410.

Although only a single LUN is illustrated, there may be I/Os directed to many different LUNs.

In connection with processing a write I/O operation as part of the data or I/O path, a new storage allocation from a PD may be needed. For example, a new storage allocation may be needed in connection with a first write to a logical address of a thin LUN since storage is allocated on demand. As a second example, a new storage allocation may be needed when writing to a logical address of a LUN mapped to physical storage of a PD that is shared with, or mapped for use with, one or more other logical addresses. In connection with the second example, the sharing or mapping of the same physical storage of a PD to multiple logical addresses of LUNs may occur in connection with deduplicated data or when physical storage is shared between a logical device and one of its snapshots. When a subsequent write is made to one of the multiple logical addresses, new storage may be allocated to store the new write data. As a third example, a new storage allocation may be needed when subsequently overwriting existing data currently stored at a logical address. For example, the existing data may be stored in a compressed or encrypted form. The subsequent overwriting may now store new data having a compressed form and size that does not fit into, or is more generally different from, the size of the currently allocated storage including the existing encrypted data. In this case, a new storage allocation may be needed to store the new encrypted data.

As noted elsewhere herein, in a data storage system, the amount of cache is typically much smaller as compared to the amount of physical storage capacity of PDs. For example, a 50 GB cache may be used in a data storage system providing 100 TB of storage capacity on PDs of the system.

In connection with allocating physical storage from backend PDs, an out of space or out of storage condition may be reached where there is no unused physical storage available for new storage allocations on the backend PDs. For example, an out of space condition may occur with respect to PDs of one or more of the storage tiers. In connection with an out of space or storage condition occurring on the backend PDs, a new allocation request for storage on such PDs in connection with destaging cached data will fail. As a result, WP data currently stored in cache is unable to be destaged to the PDs thereby causing the amount of available cache to decrease. As a result of the decrease in available cache, there may be subsequently no new cache locations available for storing new write data for write I/Os. As a further result of not being able to store write data for a write I/O in the cache on the data storage system, the write I/Os fail and a failure or error condition is returned to the host. Based on the foregoing chain of events initially triggered by the out of space condition of the PDs, the data storage system may eventually not be able to service any new write I/Os requiring a new cache allocation to store WP data. Additionally, all or an undesirable amount of cache may be used to store the WP data whereby there may be an insufficient amount of unused cache locations available for subsequent I/Os and other processing.

In some cases, a minimum threshold amount of available storage may be specified to denote a state of the data storage system approaching or nearing an actual out of space or storage condition. However, when the current level of unused storage reaches the minimum threshold, it may be a short amount of time before the actual out of space or storage condition occurs resulting in the inability to destage WP data from the cache to physical storage on backend PDs.

As described above in connection with FIG. 3, a write I/O operation received at the data storage system may be acknowledged to the host as successfully completed once the write data is stored in the cache of the data storage system. Thus, the host receives an acknowledgement regarding successful completion of the write I/O without performing any needed physical storage allocation and without requiring that the write data be stored on a PD prior to acknowledging completion of the write. However, in such a system, the chain of events described above may occur where the data storage system's unused physical storage and cache may be exhausted.

As a first variation in connection with a write I/O operation, a data storage system may alternatively wait until after the write data has been stored on the PD whereby any needed physical storage allocation is complete prior to returning the acknowledgement to the host. As a further second variation, rather than wait until the write data is destaged from cache to a backend PD, a data storage system may alternatively wait until any needed physical storage allocation is complete prior to returning the acknowledgement to the host. However, with these two latter variations, there is an additional delay in sending the acknowledgement of the write I/O to the host as compared to the system that returns the acknowledgement in a shorter more timely manner after the write data is stored in the cache. The additional time delay may be unacceptable and may have other adverse side effects, such as causing the host to experience undesirable time outs in connection with write I/O operations.

In following paragraphs, described are credit-based techniques that may be performed. The techniques described in following paragraphs avoid the above-noted chain of events in connection with an out of space storage condition, where WP data stored in cache is unable to be destaged to PDs and where all or undesirable amount of cache may be utilized for storing WP data. Such techniques provide for fast write I/O response times experienced by the host. Such techniques provide for sending the write I/O acknowledgement to the host without requiring actual allocation of any needed physical storage from the backend PDs. The foregoing and other aspects of the techniques herein are described in more detail in following paragraphs.

In at least one embodiment in accordance with the techniques herein, one or more criteria may be specified defining when the data storage system enters a state in which the amount of available, unallocated or unused physical storage is below a specified minimum threshold level. The state into which the system enters when the amount of available, unallocated or unused physical storage is below the specified minimum threshold may also be characterized as the state of an insufficient amount of unused or unallocated physical storage. The specified minimum threshold may generally denote when the system is nearing exhaustion of its unused physical storage capacity of the backend PDs of the system. In one embodiment, the specified minimum threshold may be applied on a system wide level collectively with respect to the total amount of unused physical storage capacity of the PDs in the system.

Figure 7:
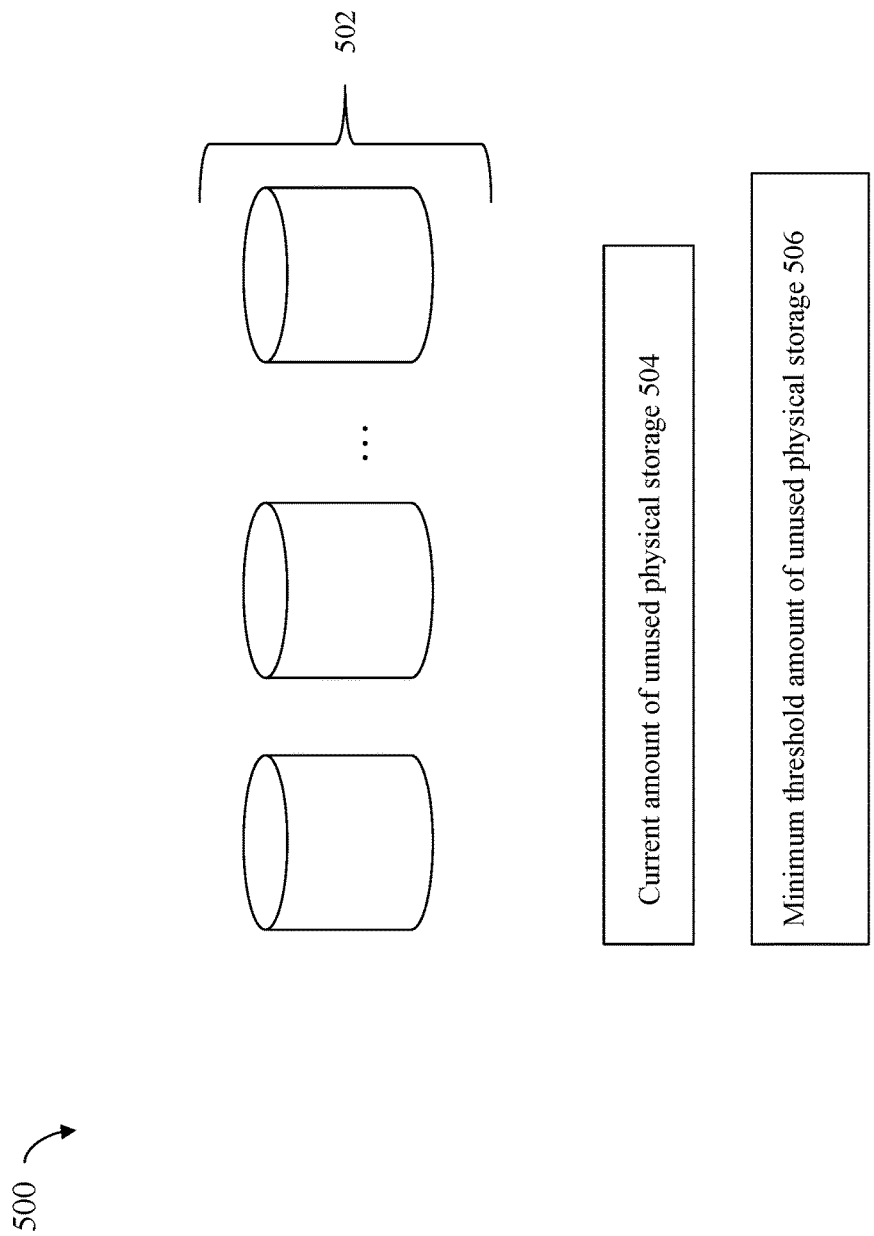
FIG. 7 is an example illustrating physical storage and data values that may be used in an embodiment in accordance with the techniques herein.

Referring to FIG. 7, shown is an example 500 illustrating the one or more criteria that may be specified in an embodiment in accordance with the techniques herein.

The example 500 includes element 502 denoting the collective set of backend PDs in the data storage system used for storing data. Storage for storing user data may be allocated from any of the PDs denoted by element 502. Storage may be provisioned or allocated from the PDs 502 in connection with LUNs storing user data.

The current amount of unused physical storage 504 denotes the current amount of unused storage capacity in the PDs 502. For example, the total amount of storage capacity of the PDs 502 may be 100 TB (terabytes) and the current amount unused physical storage 504, at a first point in time, may be 50 TB. As additional physical storage from the PDs 502 is allocated or provisioned for storing data, the current amount of unused physical storage 504 decreases.

The minimum threshold amount of unused physical storage 506 denotes the specified minimum threshold of unused physical storage applied on a system wide level collectively with respect to the total amount of unused physical storage capacity of the PDs 502 in the system. When the current amount of unused physical storage 504 is less than or equal to the threshold 506, the data storage system may be characterized as approaching an out of physical storage state with at no more than the minimum threshold amount of unused physical storage 506 remaining.

More generally, element 502 denotes a particular resource of the data storage system, element 504 denotes the current unused amount of the resource, and element 506 denotes a minimum threshold amount of the resource. When the current level 504 is equal to or less than the threshold 506, the system may be characterized as being in a state in which there is an insufficient amount of the resource that is available, unused or unallocated.

Processing may be performed in the data storage system to monitor the current amount of unused physical storage 504 in the PDs 502 of the system. A determination that the current amount of unused physical storage 504 is less than or equal to the threshold 506 results in triggering use of the credit-based techniques described herein for use in connection with processing write I/O operations. If it is determined that the current amount of unused physical storage 504 is greater than the threshold 506, normal write I/O processing may be performed in which the credit-based techniques described herein are not used in connection with processing write I/O operations.

Generally, the minimum threshold amount of unused physical storage 506 may be any suitable amount that may vary with embodiment. In at least one embodiment, the minimum threshold amount of unused physical storage 506 may be determined in accordance with the size of the cache and the current amount of unused physical storage 504 in the PDs 502. In at least one embodiment, the minimum threshold amount of unused physical storage 506 may be the size of the cache in the data storage system. In such an embodiment, the credit-based techniques described herein are used in connection with processing write I/O operations responsive to determining that the current amount of unused physical storage 504 is less than or equal to the size of the cache in the data storage system. In at least one embodiment, the size of the cache may denote the amount of cache storage used as a data cache for servicing I/O operations. In one aspect in such an embodiment, a trigger condition triggering use of the credit-based techniques herein when processing write I/O operations is defined as a determination that the current amount of unused physical storage 504 is less than or equal to the size of the cache.

In at least one embodiment in accordance with the techniques herein, the processing as described in connection with FIG. 3 may denote the normal write I/O processing when the current amount of unused physical storage 504 is greater than the threshold 506. What will now be described in more detail is alternative write I/O processing using the credit-based techniques described herein when processing write I/O operations, where such alternative write I/O processing is performed responsive to determining that the current amount of unused physical storage 504 is less than or equal to the threshold 506. More generally, such alternative write I/O processing may be performed responsive to detecting a trigger condition denoting that the system has entered a state in which there is an insufficient amount of unused or unallocated physical storage.

In at least one embodiment providing compression, the current amount of unused physical storage 502 may denote the current amount of unused physical storage with respect to uncompressed data storage. In such an embodiment, the backend PDs may be included in multiple storage pools where one or more of the pools may be used for storing only compressed, and where one or more of the pools may be used for storing only uncompressed data. In this case, the current amount of unused physical storage 502 may denote the current amount of unused or unallocated physical storage with respect to those one or more pools of PDs used for storing uncompressed data.

Figure 8:
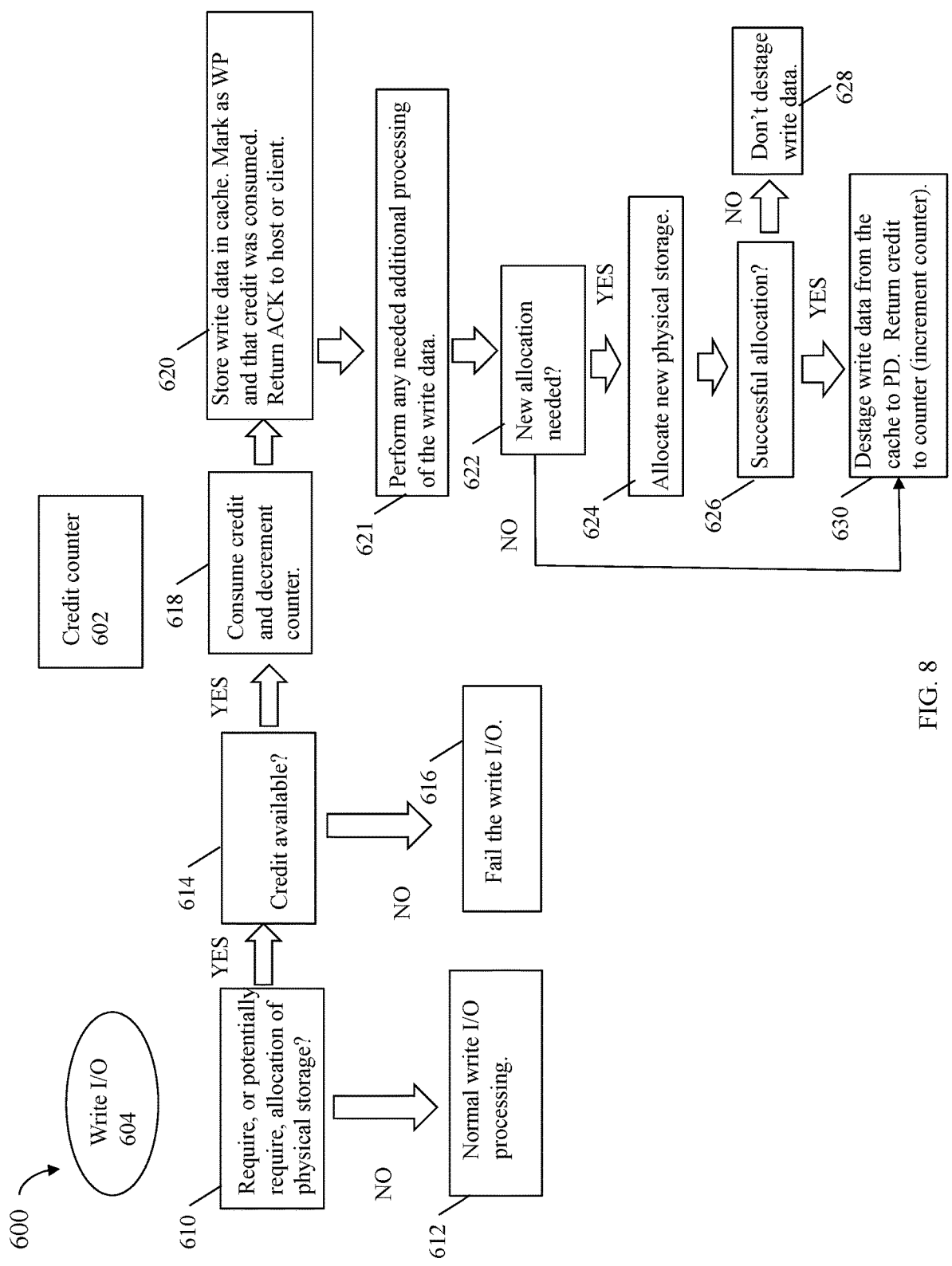
FIG. 8 is an example illustrating data flow and processing that may be performed in an embodiment in accordance with the techniques herein.

Referring to FIG. 8, shown is an example 600 illustrating a data flow of processing that may be performed in an embodiment in accordance with the techniques herein.

Once the system enters the state of having an insufficient amount of unused or unallocated physical storage as described above, processing may be performed to initialize the credit counter 602 with an initial amount of credits. In at least one embodiment, the initial amount of credits may be selected in accordance with the size of the cache in the data storage system. In such an embodiment, the initial amount of credits placed in the counter 602 may be less than the size of the cache and may be, for example, a percentage or fraction of the size of the cache. For example, in at least one embodiment, the initial amount of credits placed in the counter 602 may be 50% or ½ the size of the cache. Each credit may denote a particular amount of physical storage. Any suitable size may be selected for each credit. For example, in one embodiment, each credit may denote the size of a chunk of storage that is a single track of storage. The size or amount of physical storage denoted by each credit may vary with the write or destaging granularity size. For example, if the cache size is 50 GB, then the counter 602 may be initialized with a number of credits equal to 50% of the cache size or 25 GB's worth of credits.

Subsequent to initializing the counter 602, processing may wait to receive a write I/O operation. In this example, assume that write I/O operation 604 is then received while the system has an insufficient amount of physical storage in the backend PDs (e.g., the current amount of unused physical storage 504 of the PDs 502 is less than or equal to the minimum threshold 506). The write I/O 604 may write data to a target location expressed as a target LUN and offset or LBA in the target LUN's logical address space. What will now be described is processing of the write I/O 604 in an embodiment in accordance with the techniques herein.

At the step 610, a determination is made as to whether destaging the write data of the write I/O will require, or potentially require, allocation of physical storage from the backend PDs.

Consider a simple case where the target LUN's data is uncompressed and there are no further data services of data deduplication or snapshots of the target LUN. In one case, the write I/O operation 604 may be rewriting over existing data currently stored physical storage that is already allocated and mapped to the target LBA. In this case, no new or additional physical storage allocation is required in order to destage the write data of the write I/O 604. In this case, the step 610 evaluates to no and control proceeds to the step 612 where normal write I/O processing is performed. As noted elsewhere herein, the normal write I/O processing may be as described above, such as in connection with FIG. 3.

In at least one embodiment supporting thin or virtually provisioned LUNs as described elsewhere herein, physical storage is allocated and mapped into a portion of the logical address space of the thin LUN on demand the first time there is a write to that portion of the logical address space. As such, the step 610 may include determining whether physical storage is currently allocated and mapped to the target LBA of the target LUN. If the target location is currently unallocated (e.g., not mapped to an allocated physical storage location), then this is the first write to the target LBA and a new physical storage allocation is required in order to destage the write data. In this case, the step 610 evaluates to yes and control proceeds to the step 614.

In connection with the step 610, processing may determine that destaging the write data of the write I/O 604 "potentially" requires an additional or new physical storage allocation. A write I/O operation 604 may "potentially" requiring an additional or new physical storage allocation depending on the one or more particular data services enabled or in use with the target location, or more generally, target LUN. For example, if compression is enabled for the target location, then potentially an additional or new physical storage allocation may be needed for the write data. At this point in processing, assume there is existing data stored in its compressed form at the target location. The compressed existing data may be stored on a first chunk of physical storage having a first size. The new write data will be compressed at a later point in time and the compressed form of the new write data may have a second size that is different than the first size. For example, the second size may be larger than the first size whereby the compressed form of the new write data does not fit into the first chunk of physical storage. As a result, a new chunk of physical storage of the second size may be allocated in order to store the compressed form of the new write data. However, at the point in processing at the step 610, compression has not yet been performed and thus it may not be known whether such new allocation is needed due to the change in size of the compressed data stored at the target location. In this manner for a target location with compression enabled, the step 610 may determine that destaging the write data of the write I/O 604 "potentially" requires an additional or new physical storage allocation and the step 610 evaluates to yes.

As another example, if encryption is enabled for the target location, then potentially an additional or new physical storage allocation may be needed for the write data. At this point in processing, assume there is existing data stored in its encrypted form at the target location. The encrypted existing data may be stored on a first chunk of physical storage having a first size. The new write data will be encrypted at a later point in time and the encrypted form of the new write data may have a second size that is different than the first size. For example, the second size may be larger than the first size whereby the encrypted form of the new write data does not fit into the first chunk of physical storage. As a result, a new chunk of physical storage of the second size may be allocated in order to store the encrypted form of the new write data. However, at the point in processing at the step 610, encryption has not yet been performed and thus it may not be known whether such new allocation is needed due to the change in size of the encrypted data stored at the target location. In this manner for a target location with encryption enabled, the step 610 may determine that destaging the write data of the write I/O 604 "potentially" requires an additional or new physical storage allocation and the step 610 evaluates to yes.

Figure 9:
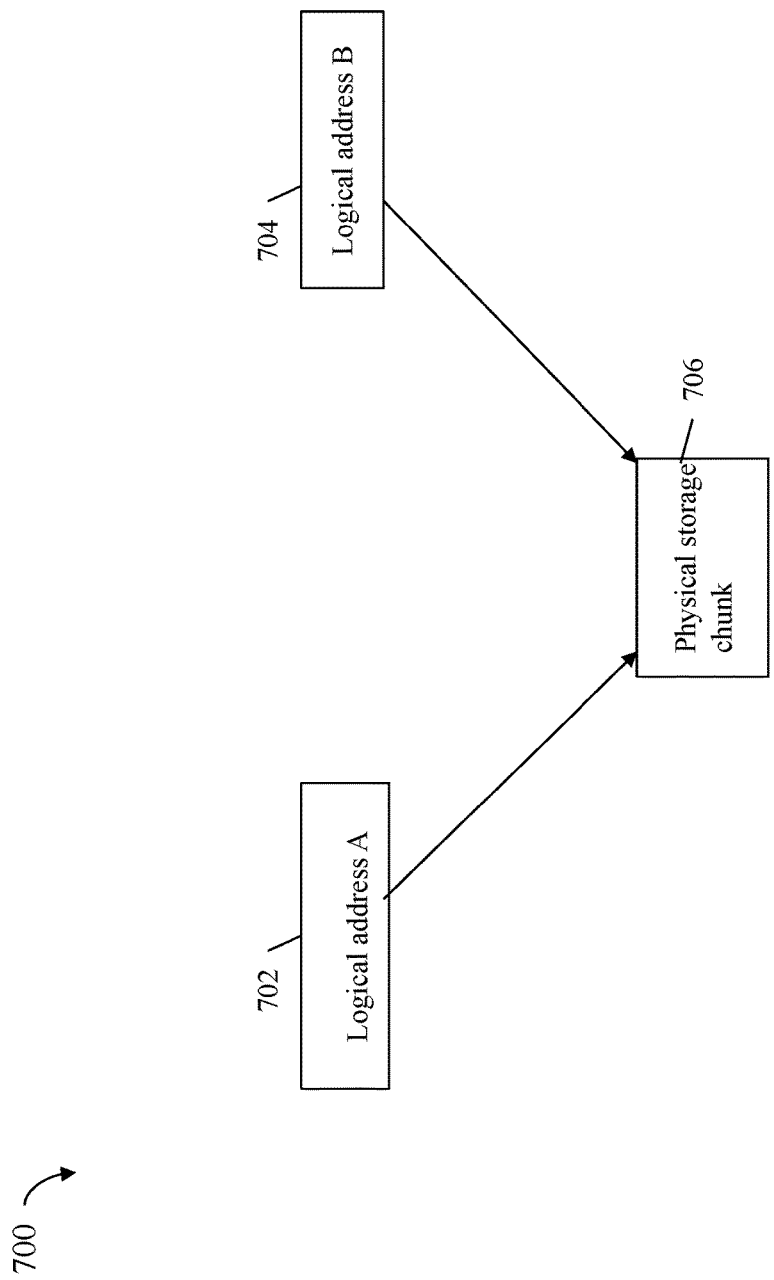
FIG. 9 is an example illustrating two logical addresses referencing the same physical storage in an embodiment in accordance with the techniques herein.

An another example of when the step 610 determines that destaging the write data of the write I/O 604 "potentially" requires an additional or new physical storage allocation, reference is made to FIG. 9. In the FIG. 9, illustrated are two logical addresses 702, 704 mapped to or referencing the same physical storage chunk 706. The scenario generally illustrated in FIG. 9 where generally more than one logical address references the same physical storage chunk 706 may occur as a result of data deduplication that may be performed as a data service in connection with the target location. For example, element 702 may denote the target location that currently references physical storage chunk 706. Additionally, a second logical address 704 may also reference the same physical storage chunk 706 denoting that both the logical addresses 702, 704 include the same data or content. In connection with data deduplication, processing may store a single copy or instance of a data value which is logically referenced by multiple logical addresses. Thus, a write to the target location 702 may potentially require an additional or new physical storage allocation for the write data. It may be characterized as potential since the write data may be unique and write a new first instance of a data value or content that needs to be stored in a newly allocated portion of physical storage. In other words, the write data written by the write I/O 604 may not be a duplicate of an existing data value and thus require an additional or new physical storage allocation. However, at the point in processing at the step 610, data deduplication has not yet been performed and thus it may not be known whether such new allocation is needed. In this manner for a target location that currently references a physical storage chunk 706 that is also referenced by one or more other logical addresses 704, The step 610 may determine that destaging the write data of the write I/O 604 "potentially" requires an additional or new physical storage allocation and the step 610 evaluates to yes.

The scenario of FIG. 9 may also occur as a result of taking snapshots of storage entities. For example, initially taking a snapshot of a source LUN may result in the snapshot and the source LUN referencing the same set of physical storage locations. As changes or writes are made to locations of either the source LUN or the snapshot, additional storage may be allocated to store the newly written data. For example, at a first point in time after initially taking a snapshot, element 702 may denote a logical address in the source LUN and element 704 may denote a logical address in the snapshot, where both 702 and 704 reference the same physical storage chunk 706. Subsequently, the write I/O 604 is issued to a target location on the source LUN where the target location is 702. In this case, potentially an additional or new physical storage allocation may be needed for the write data. It may be characterized as potential since other data services, such as data deduplication may also be enabled and performed for the target location. However, at the point in processing at the step 610, data deduplication has not yet been performed and thus it may not be known whether such new allocation is needed. In this manner for a target location that currently references a physical storage chunk 706 that is also referenced by one or more other logical addresses 704, the step 610 may determine that destaging the write data of the write I/O 604 "potentially" requires an additional or new physical storage allocation and the step 610 evaluates to yes.

Thus, in at least one embodiment, the step 610 may determine that an additional or new storage allocation is potentially needed in connection with the write I/O 604 if data deduplication and/or encryption is enabled for target location. The step 610 may determine that an additional or new storage allocation is potentially needed in connection with the write I/O 604 if the target location references a physical storage location or chunk, as in FIG. 9, that is also referenced by one or more other logical addresses.

If the step 610 evaluates to yes, control proceeds to the step 614. At the step 614, a determination is made as to whether there is sufficient credit available in the credit counter 602 for the current write I/O 604. In this example, assume that the write I/O operation 604 needs 1 credit. If the credit counter 602 does not have the needed 1 credit and the step 614 evaluates to no, control proceeds to the step 616 where the write I/O fails and the data storage system does not service the write I/O 604. In the step 616, an error or failure condition is returned to the host or other client that issued the write I/O 604. If the credit counter 602 does have the needed 1 credit and the step 614 evaluates to yes, control proceeds to the step 618. At the step 618, the credit for the write I/O 604 is consumed by decrementing the credit counter by 1. From the step 618, control proceeds to the step 620.

At the step 620, processing proceeds to store the write data of the write I/O 604 into a cache location and marks the cache location as containing WP data. Additionally, in the step 620, processing may include storing another indicator associated with the cache location including the WP data denoting that one credit was consumed in connection with the WP data. The cache may include WP data that was placed into the cache while the credit based technique as described in connection with FIG. 8 is in effect (e.g., when the system is in the state of insufficient physical storage). Additionally, the cache may also include WP data placed into the cache while the credit based technique as described in connection with FIG. 8 is not in effect (e.g., when the system is in the state of insufficient physical storage) or more generally, in connection with processing writes that did not result in consuming a credit from the credit counter 602. In connection with subsequent processing described below, as cached data is destaged, it is necessary to know which cache locations include WP data that consumed a credit since, upon successful destaging, such credit is returned to the credit counter 602. However, such processing does not want to increment the counter 602 for those cache locations that include WP data that did not consume a credit.

The step 620 also includes returning an acknowledgement to the host or other client that issued the write I/O 604 regarding successful completion of the write I/O.

From the step 620, processing proceeds to the step 621. In the step 621, any additional processing needed for the write data may be performed. The particular processing performed in connection with the step 621 may vary with the particular data services enabled for the target location. For example, if compression is enabled for the target location, the step 621 may include compressing the write data. If data deduplication is enabled for the target location, the step 621 may include performing data deduplication processing of the write data. If encryption is enabled for the target location, the step 621 may include encrypting the write data. From the step 621, processing proceeds to the step 622 where a determination is made as to whether a new allocation is needed for the write data.

For example, if the write I/O 604 is a write to a target location that is unallocated or not mapped to physical storage, the step 622 determines that a new physical storage allocation is needed to store the write data whereby the step 622 evaluates to yes.

If the target location is allocated and references existing physical storage (e.g., write I/O 604 is overwriting existing data currently stored at the target location), the processing performed in the step 621 may generate a form of the write data having a size that is larger than a current size of the existing physical storage mapped to the target location. For example, as discussed elsewhere herein, the step 621 may include compressing the write data and the compressed form of the write data is larger than the current size of the existing physical storage mapped to the target location. In this case, the step 622 determines that a new physical storage allocation is needed to store the write data in its compressed form where the step 622 evaluates to yes.

If the target location is allocated and references existing physical storage (e.g., write I/O 604 is overwriting existing data currently stored at the target location) that is also referenced by another logical address and the write data cannot be deduplicated, the step 622 determines that a new physical storage allocation is needed to store the write data whereby the step 622 evaluates to yes.

The foregoing are some examples of additional processing that may be performed in the step 621 that affects whether the step 622 determines that a new physical storage allocation is needed for storing the write data.

If the step 622 evaluates to no, control proceeds to the step 630, discussed below. If the step 622 evaluates to yes, control proceeds to the step 624 to attempt to allocate the physical storage for the write data. From the step 624, control proceeds to the step 626 where a determination is made as to whether the physical storage allocation attempted in the step 624 was successful. If the step 626 evaluates to no where the physical storage allocation for the write data failed, control proceeds to the step 628. At the step 628, the write data currently stored in the cache is not destaged and rather remains in the cache and remains marked as WP. In at least one embodiment, at a later point in time, processing may be performed to retry destaging the write data from the cache. Thus, at the later point in time, the steps 624 and 626 may be repeated.

If the step 626 evaluates to yes, control proceeds to the step 630. At the step 630, the write data is destaged from the cache to a physical storage location on a PD, where the physical storage location is mapped to the target location. The step 630 also includes returning the credit (previously consumed in the step 618) to the credit counter 602 by incrementing the credit counter 602. The physical storage location to which the write data is written may be an existing physical storage location (if the step 622 previously evaluated to no), or may be a newly allocated storage location (if the step 622 previously evaluated to yes).

Described above is an embodiment in which a single credit counter is used. As a variation an embodiment in accordance with the techniques herein may use multiple credit counters.

Figure 10:
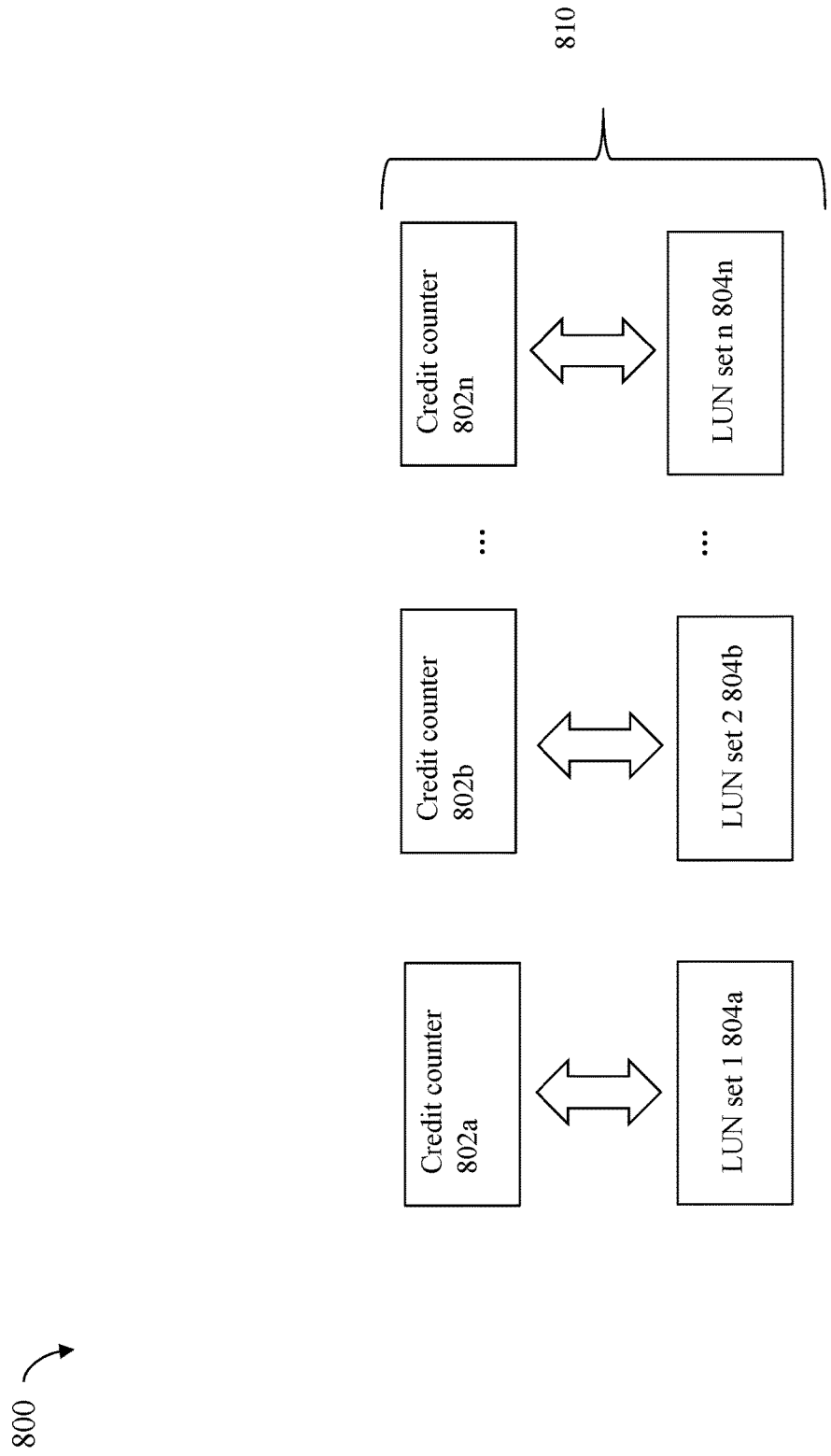
FIG. 10 is an example illustrating multiple credit counters that may be used in an embodiment in accordance with the techniques herein.

Referring to FIG. 10, shown is an example representation 800 of multiple credit counter that may be used in an embodiment in accordance with the techniques herein. The example 800 includes credit counters 802a-n associated, respectively, with LUN sets 804a-n. Each of the LUN sets 804a-n may be a logical grouping of one or more LUNs.

In at least one embodiment, the total sum or aggregate of the credit counters 802a-n may denote the total value of the single system wide credit counter 602. Thus, an embodiment may partition the credit counter 602, including a total amount of credits, into multiple credit counters 802a-n. In at least one embodiment, the total amount of credits available, as determined as the initial amount of credits in the credit counter 602, may be partitioned equally among the credit counter 802a-n so that each of the credit counters 802a-n may have the same amount of credits. Alternatively, each of the credit counters 802a-n may not contain the same amount of credits where the total amount of credits available may be distributed in different amounts across the credit counters 802a-n.

Each of the credit counters 802a-n may be associated with a different one of the LUN sets 804a-n as noted above. A write I/O operation is a write to a target location on a target LUN. In an embodiment using multiple credit counters 802a-n, the write I/O operation processing may include determining which particular one of the LUN sets 804a-n includes the target LUN. The processing described in connection with FIG. 8 may then perform the steps 614, 618 and 630 using the particular one of the credit counters 802a-n associated with the particular LUN set including the target LUN. For example, assume that the written I/O 604 is directed to a target LUN included in the LUN set 1 804a. In this case, the processing steps 614, 618 and 630 of the FIG. 8 are performed with respect to the credit counter 802a.

In at least one embodiment, the total number of available credits may be distributed among the credit counters 802a-n based on an associated priority level or performance level assigned to each of the LUN sets 804a-n. For example, an embodiment may rank the LUN sets 804a-n based on a relative priority or performance. The LUN sets ranked higher, and thus having a higher priority or performance level, may receive a greater number of credits than other LUN sets ranked lower.

The foregoing embodiments generally describe determining when there is an insufficient amount of a resource in a system, where resource is physical storage. The resource may be included in the data path or I/O path subsequent to the cache such that an insufficient amount or level of the particular resource, such as physical storage, may result in overconsumption of the cache, such as for storing WP data. More generally, the techniques herein may be used in connection with any suitable resource that is subsequent to the cache in the I/O or data path. For example, a hardware device or other component may perform a data service included as part of the I/O or data path. A queue of multiple cache locations including WP data may be waiting for processing by the hardware device or other component. Thus, there may be an overconsumption of cache holding WP data waiting for processing by the hardware device or component in the next phase or stage of the I/O or data path. The techniques herein may be used more generally in connection with any such resource, like physical storage, that is subsequent to the cache in the I/O or data path.

In connection with FIGS. 7 and 8, described is an embodiment in which the pair of values 504 and 506 may be used with respect to 502 denoting all the physical storage or PDs in the system. Thus, the single pair of values 504 and 506 may be applied collectively across multiple storage tiers denoted by 502. As a variation, an embodiment may specify a single pair of counters 504 and 506 for each storage tier of PDs. For example, if a data storage system includes three storage tiers of PDs as described elsewhere herein, 3 pairs of counters 504 and 506 may be maintained for 3 storage tiers (e.g., each tier having its own pair of counters 504 and 506). In such an embodiment, the selection of the minimum threshold 506 may be performed based on the cache size. In particular, the threshold 506 may be a fraction or percentage (less than 100%) of the cache size, such as 50% of the cache size, or a smaller percentage of the cache, such as based on the total capacity of the particular tier relative to the total capacity of all the tiers. For example, the smaller the total capacity of the particular tier, the lower the percentage of the cache size used in determining the threshold 506 for the particular tier. For example, assume there are 2 tiers of PDs and each of the 2 tiers has the same storage capacity. If 50% of the cache size is used as the minimum threshold 506 for the 2 tiers collectively, each of the individual 2 tiers may have a minimum threshold 506 of 25% of the cache size.

In at least one embodiment having adapters or directors including HAs, DAs and data service adapters (EDSs), when a new write I/O is received by an HA, processing may be performed by the HA to determine whether the write I/O requires a physical storage allocation or potentially requires a physical storage allocation. As discussed above, at this point in processing, it may be known that a new storage allocation is required, for example, if the write is to a target location currently unallocated or not mapped to physical storage. Processing may know that a new storage allocation is not required, for example, if the target location is allocated and mapped to physical storage and also compression is not enabled for the target location. On the other hand, if the target location is allocated and mapped to physical storage and compression is enabled for the target location, the write operation may be overwriting existing compressed data and a new storage allocation may be potentially needed.

If processing determines that no physical storage allocation is required and that no physical storage allocation is potentially required, normal write I/O processing of the write I/O may be performed. Otherwise, the HA may send a fast allocation request to an EDS. The EDS may perform processing to determine if there is a sufficient number of one or more credits for the write I/O. If so, the correct number of one or more credits may be consumed for the write I/O, the write data may be stored in cache, the EDS may return a good response to the HA, and the HA may send a successful write acknowledgement to the host that issued the write I/O. In this manner, the host may receive a timely acknowledgement or response regarding the write I/O without waiting to actually destage the write data from the cache to physical storage on backend PDs. In such an embodiment, the EDS may handle processing of the write request. Such processing may include performing a read-modify-write if needed (e.g., for partial track writes or for shared track writes), performing compression, data deduplication and/or encryption processing as may be needed by invoking the appropriate other component. The new write data may be stored on currently allocated physical storage or, as may be needed, a new physical storage allocation to accommodate any size changes or differences for storing the write data. If the write data can be destaged from the cache to physical storage on a backend PD, processing returns back the one or more credits previously taken for the write I/O. Alternatively, if the cached write data cannot be destaged such as when there is no free or available physical storage, the write data is not destaged and no credit is returned. Once all available credits are consumed, EDS will send a bad status for such "fast allocation" to the HA. In turn, the HA fails the host write.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
  receiving a write I/O operation that writes first data to a target location denoting a logical address;
  determining whether a current amount of unused physical storage is greater than a threshold; and
  responsive to determining the current amount of unused physical storage is greater than the threshold, performing normal write processing, and otherwise performing alternative write processing including:
    initializing a counter with an initial amount of credits;
    determining whether a physical storage allocation is needed or potentially needed for the write I/O operation;
    responsive to determining that no physical storage allocation is needed for the write I/O operation, performing the normal write processing; and
    responsive to determining that a physical storage allocation is needed or potentially needed for the write I/O operation, performing first processing comprising:
      determining a first amount of one or more credits needed to service the write I/O operation;
      determining whether the counter includes at least the first amount of one or more credits; and
      responsive to determining the counter does not include at least the first amount of one or more credits, failing the write I/O operation.

2. The method of claim 1, wherein the first processing further comprises:
  responsive to determining the counter includes at least the first amount of one or more credits, performing second processing including:
    deducting the first amount of one or more credits from the counter;
    storing the first data in a first cache location;
    marking the first cache location as including write pending (WP) data;
    marking the first cache location as consuming the first amount of one or more credits; and
    returning an acknowledgement to a host that issued the write I/O operation.

3. The method of claim 2, wherein the second processing further comprises:
  responsive to determining a new physical storage location is needed for storing the first data, performing allocation processing to allocate the new physical storage location;
  determining whether the allocation processing successfully allocated the new physical storage location; and
  responsive to determining the allocation processing successfully allocated the new physical storage location, performing processing including:
    destaging the first data from the first cache location to the new physical storage location; and
    incrementing the counter by the first amount of one or more credits.

4. The method of claim 3, wherein the second processing further comprises: responsive to determining the allocation processing did not successfully allocate the new physical storage location, determining not to currently destage the first data from the first cache location.

5. The method of claim 1, wherein the alternative write processing determines that no physical storage allocation is needed or potentially needed for the write I/O operation if the target location is currently mapped to a physical storage location and no compression is performed for data stored at the target location.

6. The method of claim 1, wherein the alternative write processing determines that physical storage allocation is needed or potentially needed for the write I/O operation if the target location is currently mapped to a physical storage location and the physical storage location is also referenced by at least one other logical address.

7. The method of claim 1, wherein the alternative write processing determines that physical storage allocation is needed or potentially needed for the write I/O operation if the target location is currently mapped to a physical storage location and data stored at the target location is compressed.

8. The method of claim 1, wherein the alternative write processing determines that physical storage allocation is needed for the write I/O operation if the target location is currently not mapped to a physical storage location.

9. The method of claim 1, wherein the alternative write processing determines that physical storage allocation is needed or potentially needed for the write I/O operation if the target location is currently mapped to a physical storage location and data stored at the target location is encrypted.

10. The method of claim 1, wherein the threshold is selected in accordance with a size of a cache used to store data for servicing I/O operations.

11. The method of claim 10, wherein the threshold is selected as a percentage of the size of the cache, and wherein the percentage is less than 100%.

12. The method of claim 1, wherein the write I/O operation writes the first data to the target location that is a logical address on a first logical device, wherein the counter is one of a plurality of counters, and wherein the counter is associated with a set of one or more logical devices including the first logical device.

13. The method of claim 1, wherein the current amount of unused physical storage is with respect to physical storage devices of a plurality of storage tiers.

14. The method of claim 1, wherein the current amount of unused physical storage is with respect to physical storage devices in one of a plurality of storage tiers.

15. A system comprising:
one or more processors; and
a memory comprising code stored thereon that, when executed by at least a first of the one or more processors, performs a method of processing I/O operations comprising:
receiving a write I/O operation that writes first data to a target location denoting a logical address;
determining whether a current amount of unused physical storage is greater than a threshold; and
responsive to determining the current amount of unused physical storage is greater than the threshold, performing normal write processing, and otherwise performing alternative write processing including:
initializing a counter with an initial amount of credits;
determining whether a physical storage allocation is needed or potentially needed for the write I/O operation;
responsive to determining that no physical storage allocation is needed for the write I/O operation, performing the normal write processing; and
responsive to determining that a physical storage allocation is needed or potentially needed for the write I/O operation, performing first processing comprising:
determining a first amount of one or more credits needed to service the write I/O operation;
determining whether the counter includes at least the first amount of one or more credits; and
responsive to determining the counter does not include at least the first amount of one or more credits, failing the write I/O operation.

16. A computer readable medium comprising code stored thereon that, when executed, performs a method of processing I/O operations comprising:
receiving a write I/O operation that writes first data to a target location denoting a logical address;
determining whether a current amount of unused physical storage is greater than a threshold; and
responsive to determining the current amount of unused physical storage is greater than the threshold, performing normal write processing, and otherwise performing alternative write processing including:
initializing a counter with an initial amount of credits;
determining whether a physical storage allocation is needed or potentially needed for the write I/O operation;
responsive to determining that no physical storage allocation is needed for the write I/O operation, performing the normal write processing; and
responsive to determining that a physical storage allocation is needed or potentially needed for the write I/O operation, performing first processing comprising:
determining a first amount of one or more credits needed to service the write I/O operation;
determining whether the counter includes at least the first amount of one or more credits; and
responsive to determining the counter does not include at least the first amount of one or more credits, failing the write I/O operation.

17. The computer readable medium of claim 16, wherein the first processing further comprises:
responsive to determining the counter includes at least the first amount of one or more credits, performing second processing including:
deducting the first amount of one or more credits from the counter;
storing the first data in a first cache location;
marking the first cache location as including write pending (WP) data;
marking the first cache location as consuming the first amount of one or more credits; and
returning an acknowledgement to a host that issued the write I/O operation.

18. The computer readable medium of claim 17, wherein the second processing further comprises:
responsive to determining a new physical storage location is needed for storing the first data, performing allocation processing to allocate the new physical storage location;
determining whether the allocation processing successfully allocated the new physical storage location; and
responsive to determining the allocation processing successfully allocated the new physical storage location, performing processing including:
destaging the first data from the first cache location to the new physical storage location; and
incrementing the counter by the first amount of one or more credits.

19. The computer readable medium of claim 18, wherein the second processing further comprises: responsive to determining the allocation processing did not successfully allocate the new physical storage location, determining not to currently destage the first data from the first cache location.

20. The computer readable medium of claim 16, wherein the alternative write processing determines that no physical storage allocation is needed or potentially needed for the write I/O operation if the target location is currently mapped to a physical storage location and no compression is performed for data stored at the target location.

* * * * *